US010478942B2

(12) United States Patent
Endres et al.

(10) Patent No.: US 10,478,942 B2
(45) Date of Patent: Nov. 19, 2019

(54) NOZZLE CARRIER FOR A TOOL GRINDING MACHINE

(71) Applicant: ISOG Technology GmbH, Weilheim (DE)

(72) Inventors: Reinhard Endres, Weilheim (DE); Georg Mörsch, Weilheim (DE); Günther Strasser, Weilheim (DE)

(73) Assignee: ISOG TECHNOLOGY GMBH, Weilheim (DE)

( * ) Notice: Subject to any disclaimer, the term of this patent is extended or adjusted under 35 U.S.C. 154(b) by 0 days.

(21) Appl. No.: 16/057,591

(22) Filed: Aug. 7, 2018

(65) Prior Publication Data

US 2018/0345455 A1 Dec. 6, 2018

Related U.S. Application Data

(63) Continuation of application No. PCT/EP2017/054047, filed on Feb. 22, 2017.

(30) Foreign Application Priority Data

Feb. 22, 2016 (EP) .................................... 16156717
Aug. 18, 2016 (EP) .................................... 16184793

(51) Int. Cl.
*B24B 55/00* (2006.01)
*B24B 55/02* (2006.01)
*B24B 3/02* (2006.01)
*B24B 3/24* (2006.01)

(52) U.S. Cl.
CPC ................ *B24B 55/02* (2013.01); *B24B 3/02* (2013.01); *B24B 3/24* (2013.01)

(58) Field of Classification Search
CPC .. B24B 55/02; B24B 3/02; B24B 3/04; B23Q 11/1076; B23Q 11/1084
USPC ........................................................... 451/73
See application file for complete search history.

(56) References Cited

U.S. PATENT DOCUMENTS

| 1,738,646 | A | * | 12/1929 | Graves ............... B23Q 11/1084 29/DIG. 57 |
| 4,484,417 | A | * | 11/1984 | Klingerman ........... B23D 59/02 125/13.01 |
| 4,739,586 | A | * | 4/1988 | Eckardt .............. B23Q 11/1084 451/251 |
| 4,929,130 | A | | 5/1990 | Diebolt et al. |

(Continued)

FOREIGN PATENT DOCUMENTS

DE 20005648 U1 6/2000
EP 0305616 3/1989
(Continued)

*Primary Examiner* — George B Nguyen
(74) *Attorney, Agent, or Firm* — Quarles & Brady LLP; Yakov S. Sidorin

(57) ABSTRACT

A coolant nozzle carrier for use with a grinding machine that has a grinding spindle for supporting and driving a grinding disc with a rotational axis. The coolant nozzle carrier comprises at least two coolant nozzles and at least a center leg and two side legs that are attached to the center leg. Each of the side legs supports at least one nozzle and extends in a plane that is perpendicular to the rotational axis. The side legs are configured to accommodate the grinding disc in between the side legs with a moving gap defined between the grinding disc and the side legs.

16 Claims, 8 Drawing Sheets

(56) References Cited

U.S. PATENT DOCUMENTS

| | | | |
|---|---|---|---|
| 5,833,523 A * | 11/1998 | Hykes | B24B 5/42 |
| | | | 451/450 |
| 6,123,606 A | 9/2000 | Hill et al. | |
| 9,393,671 B2 | 7/2016 | Webster et al. | |
| 2003/0100245 A1 | 5/2003 | Kopmanis | |
| 2006/0068683 A1 * | 3/2006 | Sudo | B24B 7/228 |
| | | | 451/5 |

FOREIGN PATENT DOCUMENTS

| | | |
|---|---|---|
| EP | 1195224 | 4/2002 |
| EP | 2404704 | 1/2012 |
| WO | 2014035789 | 3/2014 |

* cited by examiner

NOZZLE CARRIER FOR A TOOL GRINDING MACHINE

CROSS-REFERENCE TO RELATED APPLICATIONS

This application is a continuation of pending International Application No. PCT/EP2017/054047 filed on 22 Feb. 2017, which designates the United States and claims priority from European Application No. 16156717.7 filed on 22 Feb. 2016 and European Application No. 16184793.4 filed on 18 Aug. 2016. The disclosure of each of the above-identified patent applications is incorporated herein by reference.

BACKGROUND

1. Field of the Invention

The invention relates to cooling of a tool grinding machine and a cooling apparatus of a tool grinding machine. In particular the invention relates to a nozzle carrier being configured to be mounted to a tool grinding machine.

2. Description of Relevant Art

Tool grinding machines are machine tools for grinding tools or similar parts from typically essentially cylindrical workpieces, e.g. to manufacture drill bits, milling cutters and the like. During the grinding process the grinding disc and the workpiece heat up. This heat imposes restrictions on the grinding speed and thus on the number of workpieces being finished per unit of time. To enhance the grinding speed, liquid cooling of the grinding process can be considered to be current state of the art. A cooling liquid, the so called coolant is provided via coolant tubes to the grinding disc and the workpiece. The higher the coolant flow, the higher the grinding speed. But enhancing the coolant flow increases the cost for cooling and thus for the grinding process. Examples for grinding cooling systems are disclosed e.g. in U.S. Pat. No. 9,393,671 B2, US 2003/0100245, U.S. Pat. No. 6,123,606 or EP 1 195 224 A1, to name only a few. Most publications suggest to apply a coolant jet tangentially to the grinding disk's radial surface (i.e. to the grinding surface). The coolant shall preferably be applied to the grinding disc with the circumferential speed of the grinding disc. The teachings of these publications are quite different with respect to the preferred application of the coolant. For example, EP 1 195 224 A1 suggests not to direct a coolant jet from a nozzle to the machining region, US 2003/0100245 A1 in contrast suggest to spray the coolant between the grinding tool and the workpiece.

WO 2014/035789 A1 suggests a coolant nozzle carrier with a header portion supporting two fluid manifolds. The fluid manifolds are removable attached to a center leg by a snap-in mount system, enabling to change the legs without the use of tools. The fluid manifolds are firmly attached to the header portion during operation of the machine tool.

EP 2404704 A1 suggests to pivot coolant nozzle of a machine tool automatically if the grinding tool's dimensions are reduced due to wear of the grinding tool.

EP 0 305 616 A1 suggests to attached a so called "body block" comprising a fluid channel to a tool holder of a machine tool. The fluid channels enables to provide coolant flow via a nozzle pointing to the machining point.

U.S. Pat. No. 4,929,130 suggests a grinding machine with grinding wheel being protected by an arcuate frame. The frame is adjustable to accommodate different grinding tool and supports coolant nozzles.

SUMMARY

The problem to be solved by the invention is to provide an efficient cooling system for a multi axis machine tool.

A solution to the problem is provided by a coolant nozzle carrier (a 'nozzle carrier', for short) as set below in more detail.

The coolant nozzle carrier is configured to be mounted to a grinding machine. The tool grinding machine has a grinding spindle configured for supporting and driving a grinding disc. The grinding spindle and the grinding disc as usual have a common rotational axis. The grinding disc as well defines a peripheral surface, which is usually used for grinding. The grinding disc as well has a front and a rear surface. The front surface faces towards the grinding spindle and the rear surface faces away from the grinding spindle. In the typical cases of flat front and rear surfaces they are thus perpendicular to the rotational axis. The coolant nozzle carrier has an alignment axis, and the nozzle carrier is configured to be mounted in a position and orientation that the alignment axis and the rotational axis of the corresponding tool grinding machine are at least essentially aligned ($\pm 10°$, preferably $\pm 5°$ or even better). For simplicity, we will not further distinguish between the main axis and the rotational axis as when in use these axis are preferably identical.

The nozzle carrier includes at least a center leg and two side legs being attached to the center leg, wherein the side legs each support at least one coolant nozzle (briefly 'nozzle'). The side legs extend in the same plane. When the nozzle carrier is mounted, this plane is preferably perpendicular to the rotational axis. The side legs are configured to receive a grinding disc in between of the side legs with a moving gap in between of the grinding disc and the side legs. The side legs and the center leg thus enclose or more precisely embrace a disc (like) space. The space does not necessarily be need to be cylindrical but can have the shape of any kind of plate. This embracing enables to position nozzles configured for providing a jet of a coolant to almost any position of a grinding disc and as well the workpiece being machined using the grinding disc. This enables to very effectively cool the grinding disc and the workpiece with a reduced coolant flow rate.

Preferably, the center leg contains at least one coolant inlet of a coolant channel. The coolant channel is preferably firmly attached to the center leg. Preferably, the coolant channel is an internal coolant channel of the center leg. This coolant channel is via coolant channels of the side legs in fluid communication with coolant nozzles (briefly 'nozzles'), to thereby place the nozzles in fluid communication with the coolant inlet. In other words feeding the center leg's coolant inlet with a coolant flow will result in coolant jets being ejected by the nozzles. By the internal or at least rigidly mounted coolant channels their position is known by design, different from flexible coolant hoses as suggested by the prior art. This position being known by design enables an automated collision avoidance: In other words when changing the position of the workpiece relative to the grinding disc, be it to provide a particular grinding angle or when replacing the workpiece against a new one, a controller can simulate the movement and check it for possible collisions of the workpiece or a robot's arm prior to execution of the respective movement. Flexible hoses make this automated collision avoidance more difficult or at least require an enlarged safety-zone in the area where the flexible hose is expected to be. The same advantages take place when exchanging the grinding disc, be it because it has reached the end of its lifecycle or be it because the workpiece's geometry requires different grinding tool.

Advantageously, the side legs are pivotably attached to the center leg e.g. by hinge(s) and/or each of the side legs comprises a corresponding hinge. These hinges enable the free ends of the side legs to pivot, preferably radially outward and/or parallel to the rotational axis, in operation of the nozzle carrier.

Such pivotable movement allows the side legs to flex away in case of a collision with a workpiece or the grinding disc, e.g. during replacement of the workpiece and/or the grinding disc. Particularly preferred, the pivotable movement is provided by ball-and-socket joints. These joints may comprise an internal fluid passage connecting the fluid channels of the center leg with the side legs.

Preferably, the pivotable attachment and/or the hinges provide a stop element (or stop, for short, or obstruction element) defining a minimum distance between the two side legs. The side legs are preferably spring loaded against the stop. Thus, after an eventual collision, the side legs return automatically in their respective initial positions. Particularly preferred, the stop is an adjustable stop, configured to facilitate the adjustment of the distance between the two side legs as required. For example, when changing the grinding disc to a different grinding disc (having e.g. a different diameter), the size of the moving gap can be changed as required by simply adjusting the stop.

Preferably, the center leg is supported by a support bar, wherein the support bar preferably extends perpendicularly to the center leg and, therefore, parallel to the rotational axis. This enables to mount the nozzle carrier as required (e.g. aligned with the grinding disc) and to maintain a maximum of free space in the grinding area. Thus there is an enhanced degree of flexibility when positioning the workpiece relative to the grinding disc.

Particularly preferred, the support bar and/or the center leg comprise/s a locking member configured to release the connection between the support bar and the center leg. This measure enables an automated replacement of the nozzle carrier. This is particularly advantageous, if the grinding disc needs to be changed during the grinding process, e.g. to insert a grinding disc into the spindle having a different diameter. In these cases, the coolant nozzle carrier is replaced as well and the changeover time is significantly reduced, because a repetitive adjustment of the nozzles can be avoided. For example, each grinding disc can be associated with a particular nozzle carrier and if a grinding disc is inserted into the spindle the respective previously associated nozzle carrier being adjusted to its grinding disc is attached to the support bar. When removing the grinding disc and inserting another one, the locking member facilitates a release of the nozzle carrier, storing the nozzle carrier in a magazine, and mounting another nozzle carrier associated with (and thus adjusted for) another grinding disc.

The coolant may be provided by a coolant conduit of the support bar, being placed in fluid communication with a coolant channel of the center leg. Alternatively, or additionally the center leg's coolant inlet is connected to a coolant conduit inside a tubular rod, wherein the tubular rod has a longitudinal axis extending preferably perpendicular to the center leg which in practice will mean parallel to the rotational axis. In both cases of orientation, flexible hoses are avoided, thereby enhancing preemptive avoidance of collision during the operation by providing more operating space.

The tubular rod and the center leg's coolant inlet may form a releasable coupling configured to (enabling) couple and decouple the tubular rod and the center leg's coolant inlet to enhance automated changes of the coolant nozzle carrier.

If the center leg is rotatably supported, and the axis of rotation of the center leg is the rotational axis, the nozzle carrier can rotate around a grinding disc and follow the grinding point, i.e. the point where the grinding disc contacts a workpiece. This feature enables the adjustment of the position of the coolant jets to be directed towards the point of contact between the workpiece and the grinding disc, by simply rotating the center leg. This adjustment may take place during operation, in other words, the nozzle carrier and thus the nozzles may follow a moving grinding during operation by simply rotating the nozzle carrier. This can be automated easily, thus no manipulation by hand for which the grinding process would have to be stopped is required.

Preferably, the nozzle carrier comprises at least one nozzle having a coolant outlet pointing tangentially towards the peripheral surface of the grinding disc, but against the direction of rotation, i.e. against the rotational direction of the grinding disc. Pointing tangentially means that a given nozzle is judiciously oriented to direct the coolant flow, in operation, to tangentially touch the peripheral surface of the grinding disc (to be tangentially parallel to the grinding surface of the grinding disk). In other words, an axis corresponding to the direction of the coolant leaving the nozzle is a tangent to the grinding disk. In particular, if the direction to which the nozzle points is the peripheral surface of the grinding disc is offset from the grinding point, the inventors observed that longevity of the grinding disc is enhanced. A detailed explanation for the effect is not confirmed yet, but it is believed, that the jet being directed against the peripheral surface of the grinding disc removes particles from the grinding disc that previously have worn off from the workpiece by the grinding disc.

As the side legs are so to speak configured to embrace the space dimensioned to receive a grinding disc and, therefore, to embrace the grinding disc, the side legs preferably comprise at least one nozzle having a coolant outlet pointing tangentially towards the peripheral surface of the grinding disc, in the direction of rotation of the grinding disc. The corresponding coolant jet does not necessarily require to be pointed to the grinding point, as the coolant is transported/distributed with the rotating grinding disc to the grinding point (due to rotation of the grinding disk) to form a dimensionally-enhanced area of contact between the coolant and the grinding disk. The so-configured orientation of the coolant flow was demonstrate to not only significantly increase the degree of cooling of the target grinding surface due to the spatially-enhanced contact of the coolant with the grinding disc, but also to clean the grinding surface from debris produced by the grinding process.

The coolant nozzle carrier preferably comprises at least one nozzle having a coolant outlet pointing towards the front side or the rear side of the grinding disc and preferably not against its peripheral surface. Accordingly, such nozzle, in operation, mainly sprays a coolant jet on the front surface or the rear surface, respectively. This configuration allows one to make use of the front and rear surfaces, which are typically not in contact with the workpiece, for cooling the grinding disc. In other words, in operation, the heat generated during the grinding process at the peripheral surface of the grinding disc is transferred to the front and rear surfaces of the grinding disc due to thermal conductivity. From there the heat can be dissipated by providing a coolant flow to the front surface and/or the rear surface, respectively.

As explained above, the coolant nozzle carrier is preferably mounted to a grinding machine having a grinding spindle configured for supporting and driving a grinding disc with a rotational axis.

The grinding machine may preferably comprise at least two coolant nozzle carriers: a first coolant nozzle carrier, where the side legs define a first diameter, and a second coolant nozzle carrier, where the side legs define a second diameter. A preferably automated coolant nozzle exchange apparatus is structured to effectuate (enable) a replacement of the first the coolant nozzle carrier with the second coolant nozzle carrier and vice versa, and thus enables to adapt the grinding machine to changing the grinding wheel in a very short time.

Preferably, the nozzle carrier is rotatably supported to enable a rotation of the nozzle carrier e.g. around the rotational axis of the grinding disc. In other words, the rotational axes are preferably the identical or only slightly displaced relative to each other (e.g. 25% of the grinding disc diameter or less, preferably less than 10%, even more preferred 5% or less).

For example, the nozzle carrier may include a carrier support that is attached to a bearing ring. The bearing ring may be attached coaxially to the rotational axis of the grinding spindle. The rotational support may e.g. comprise a first bearing ring being firmly attached to the spindle support and a second bearing ring being rotatably supported relative to the first bearing ring.

In one example, the two bearing rings provide a fluid tight rotary joint between a coolant inlet of the first bearing ring and a coolant outlet of the second bearing ring, enabling to provide a coolant flow via the rotatable support and e.g. the carrier support to the center leg's coolant inlet and thus at the end to the nozzles. Thus, from the center leg, the coolant may flow via the coolant channel of the center leg and a coolant channel of the side legs to the nozzles.

Automation may be provided by a motor configured to drive the second bearing ring and thus enabling the rotation of the nozzle carrier around the rotational axis. The motor could be controlled by a grinding machine's control unit.

BRIEF DESCRIPTION OF THE DRAWINGS

In the following, the invention will be described by way of example, without limitation of the general inventive concept, on examples of embodiment and with reference to the drawings.

While the invention can be modified and assume alternative forms, specific embodiments are discussed below as but examples. The drawings and detailed description are not intended to limit the invention to the particular form disclosed, but to the contrary, the scope of the intention is to cover all modifications, equivalents and alternatives falling within the spirit the present invention as defined by the appended claims.

DETAILED DESCRIPTION

Figure 1:
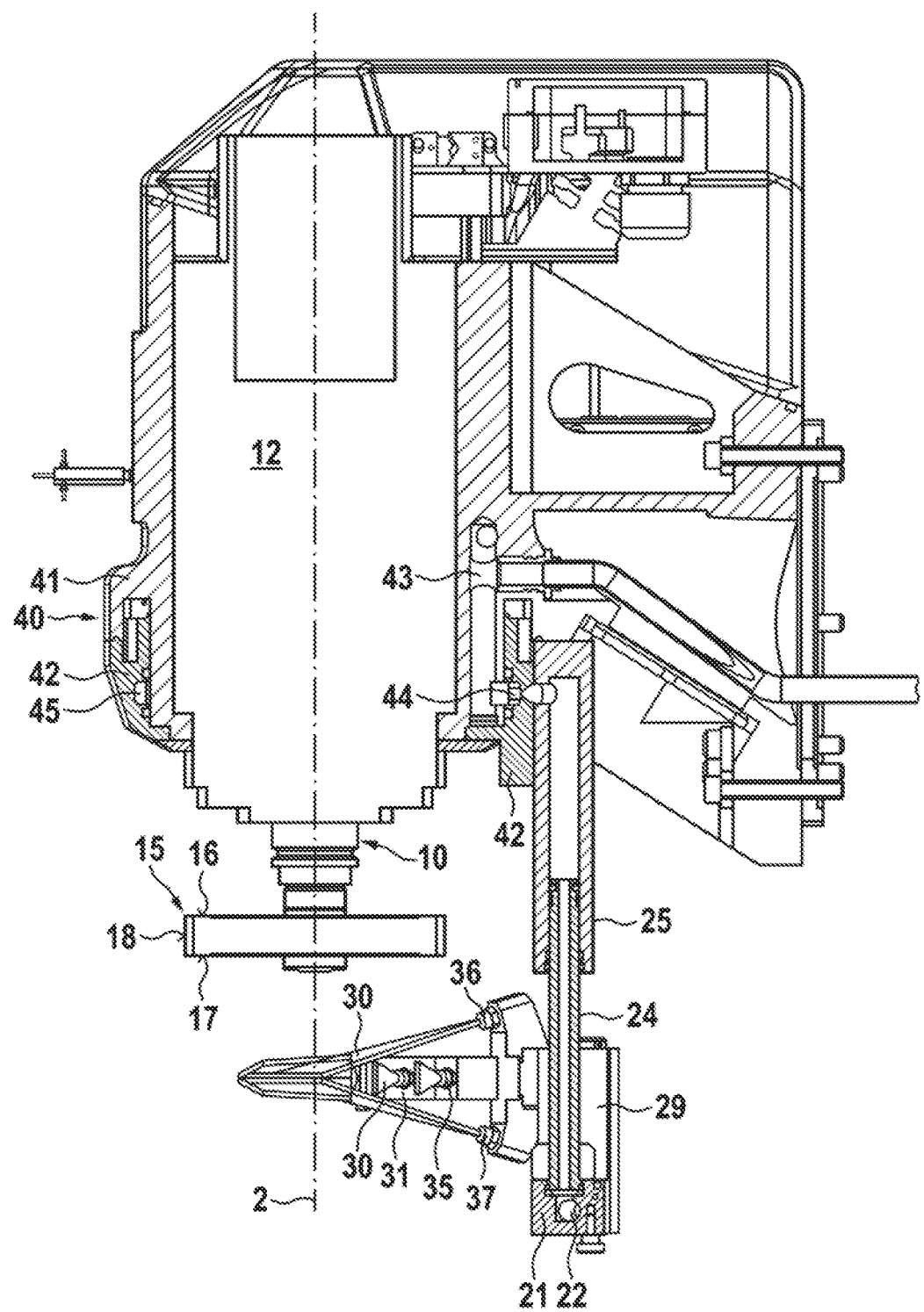
FIG. 1 shows a sketch of grinding machine with a coolant nozzle carrier.

FIG. 1 is a partial sectional drawing of a grinding machine having a grinding spindle 10 with a rotational axis 2. The grinding spindle supports a grinding disc 15 sharing the rotational axis 2. The grinding 15 disc has a front surface 16, a rear surface 17 and in between these surfaces—a peripheral grinding surface 18.

Figure 2:
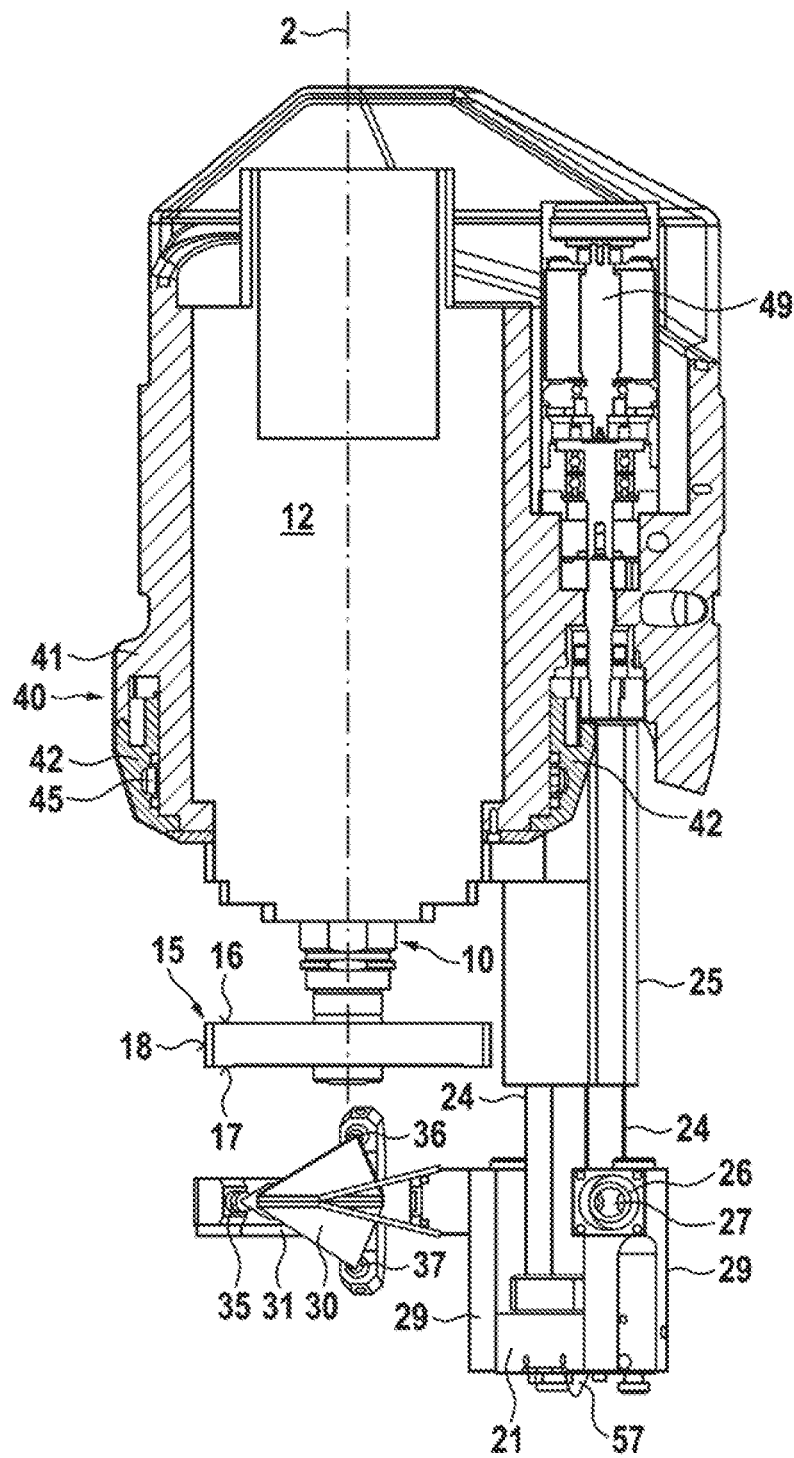
FIG. 2 shows a second sketch of grinding machine with a coolant nozzle carrier.

The grinding machine comprises a coolant nozzle carrier 20, being shown in a cross section. The coolant nozzle carrier comprises a center leg 21 having an internal coolant channel 22. The center 21 leg is supported by a support bar 23 (see FIG. 2). To the left and to the right of the support bar 23 extend coolant conduits 24. The coolant conduits 24 are rigid tubes (in contrast to flexible hoses) enabling/supporting a coolant flow from the spindle support section of the grinding machine to the nozzle carrier 20. The support bar 23 and the coolant conduits are movably supported by a carrier housing 25. The carrier support 25 telescopically supports the support bar 22 and the coolant conduits 24 parallel to the support bar. The telescopically-configured support is chosen to enable an axial movement of the center leg 20 and thus of the nozzle carrier 20. The corresponding axial displacement causes the adjustment of the height of the center leg 21 relative to the grinding disc 15. As will be apparent from the discussion below, this axial adjustment is used to axially position the nozzles 35, 36, 37 with respect to the grinding disc 15 and thus of the respective coolant jets 30 being emitted by the nozzles 35, 36, 37. In FIGS. 1 and 2, the nozzles are shown to be axially offset from the grinding disc only for the purpose of better graphical representation.

Figure 6:
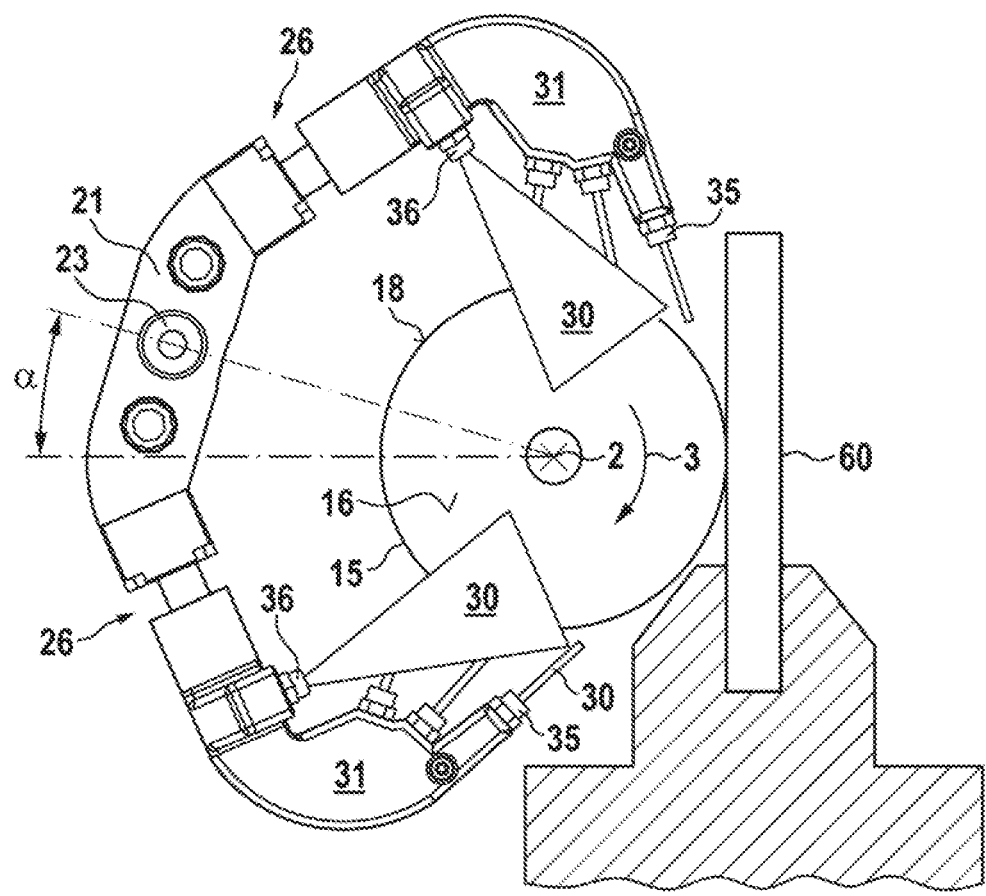
FIG. 6 shows the detail of FIG. 5, but with a rotated workpiece.

As can be best seen in FIG. 2 through to FIG. 6, the center leg 21 supports via an (optional) axial displacement member 29 two side legs 31. The side legs 31 are attached to the left and to the right of the center leg 21. In between the side legs 31 and the center leg 21 there are hinges 26 making it possible for the side legs to flex away in case of a collision with a workpiece 60 or another element. In this example, the hinges are shows as ball-and-socket joints having a central bore that provides a coolant passage 27 (configured for connecting the internal coolant channel of the center leg 21 with the corresponding internal coolant channel of the side legs 31).

Here, we considered the axial displacement members 29 to be a part/portion of the center leg 21, but more generally, such axial displacement members could as well be configured to be a part/portion of the side legs and the hinge can be placed accordingly. In a related implementation, the axial displacement members 29 could as well be omitted (not present). But if present, these members preferably comprise an internal coolant channel that is in fluid communication with the center legs' coolant inlet 22 and the side legs' 31 coolant channel.

Each of the side legs 31 supports a number of nozzles 35 in fluid communication via a coolant channel with the coolant inlet 22 of the center leg 21. These nozzles 35 are aligned in a plane, which after axial adjustment of the center leg 21 is oriented to be orthogonal to the rotational axis 2 and to intersect the peripheral ring surface 18 of the grinding disc (see FIG. 2 and on).

Further, each of the side legs comprises nozzles 36, which after axial adjustment of the nozzle carrier 20 face at an oblique angle towards the front surface 16 of the grinding disc 15. Nozzles 37 of the nozzle carrier face in an oblique angle towards the rear surface 17 of the grinding disc 15.

The nozzle carrier 20 is rotatably supported to enable a rotation of the nozzle carrier 20 around the rotational axis 2(see FIG. 1 and FIG. 2). In this example, the carrier support 25 is attached to a bearing ring 40. The rotational support 40 comprises a first bearing ring 41 firmly attached to the spindle support. The first bearing ring 41 is centered with the rotational axis 2. The second bearing ring 42 is rotatably supported relative to the first bearing ring and as well centered with the rotational axis. The two bearing rings 41, 42 provide a fluidly tight (substantially fluid-impenetrable) rotary joint between a coolant inlet 43 of the first bearing ring 41 and a coolant outlet 44 of the second bearing ring 42, thereby enabling the system to provide a coolant flow via the rotatable support 40 and the carrier support 25 to the coolant conduits 24. From there, the coolant may flow via the coolant channel 22 of the center leg and a coolant channel of the side legs 31 to the nozzles 35, 36, 37. A motor 49 drives the second bearing ring 42 and thus enables the rotation of the nozzle carrier 20 around the rotational axis 2.

Figure 2A:
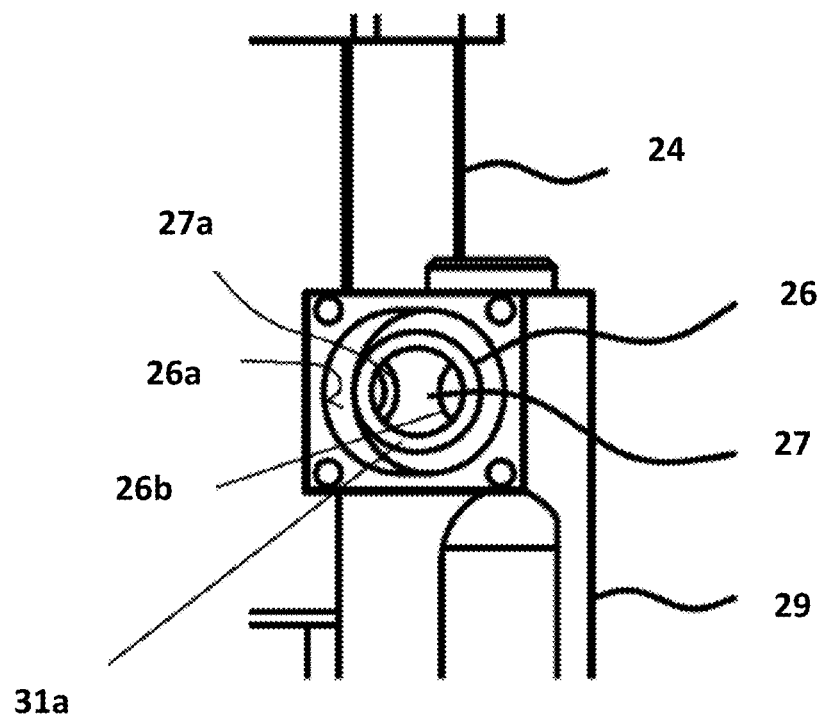
FIG. 2A describes details of FIG. 2.

FIG. 2A is an enlarged portion of FIG. 2, rendering visible one of the ball portions of the ball-and socket-joint 26 connecting the side leg 31 with the displacement member 29. Here, element 26a represents the stop that specifies a minimum distance between the two side legs. The tubular portion 31a, which is in between the hinge's ball portion and the nozzle 37, is blocked by a portion of the rim of the socket 26 that is closest to the axis 2 when the side leg 31 is pivoted outward. Two concentric ring segments 27a represent edges of the coolant channel of the member 29. The ring segment labeled 26b denotes a portion of a spring that pushes on the outer portion of the rearward edge of the hinge's ball portion and preloads the tubular portions 31a and the entire side leg 31 towards axis 2 until the coolant channel is blocked from further movement by the stop 26a.

Figure 3:
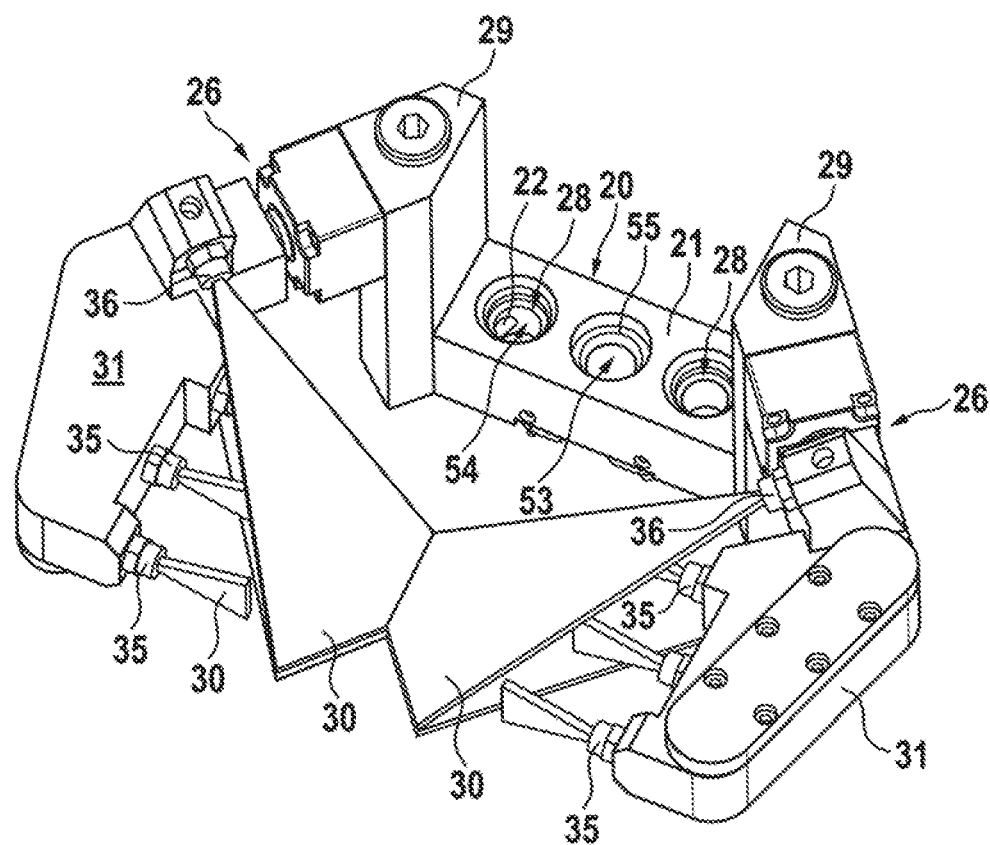
FIG. 3 shows a detail of a coolant nozzle carrier.
Figure 4:
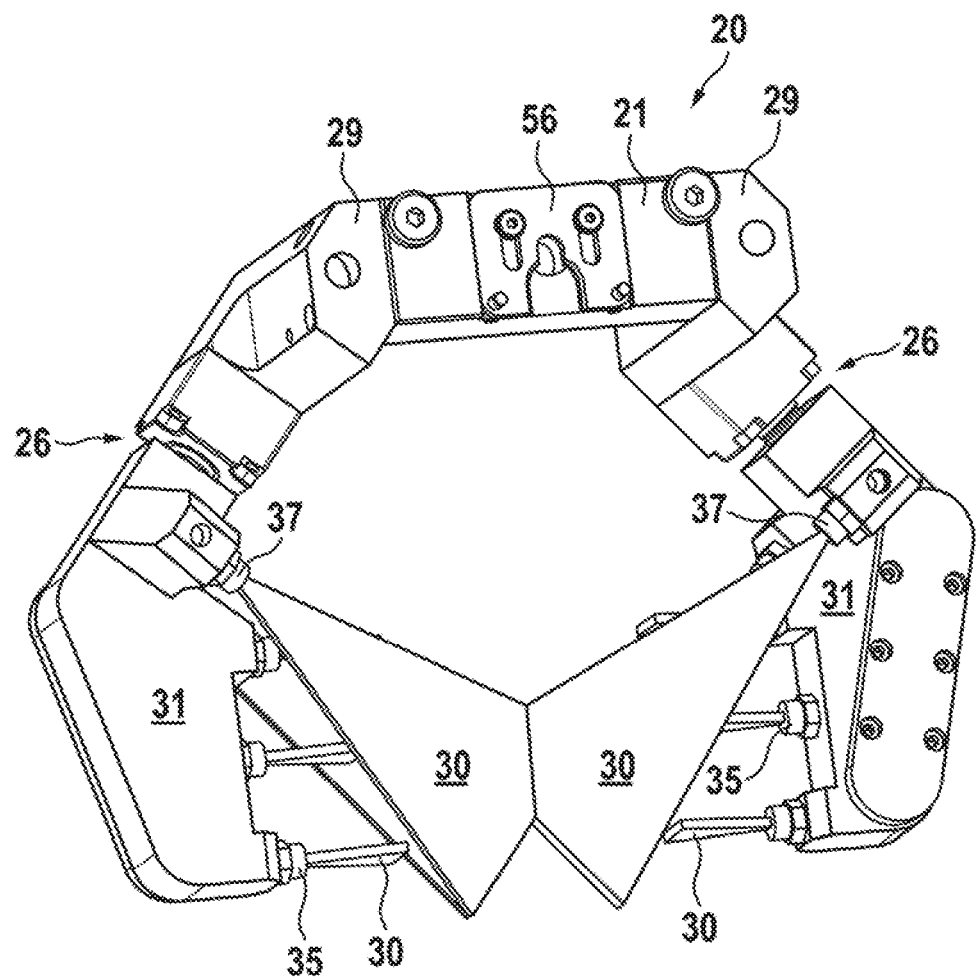
FIG. 4 shows the detail of FIG. 3 from another perspective.
Figure 5:
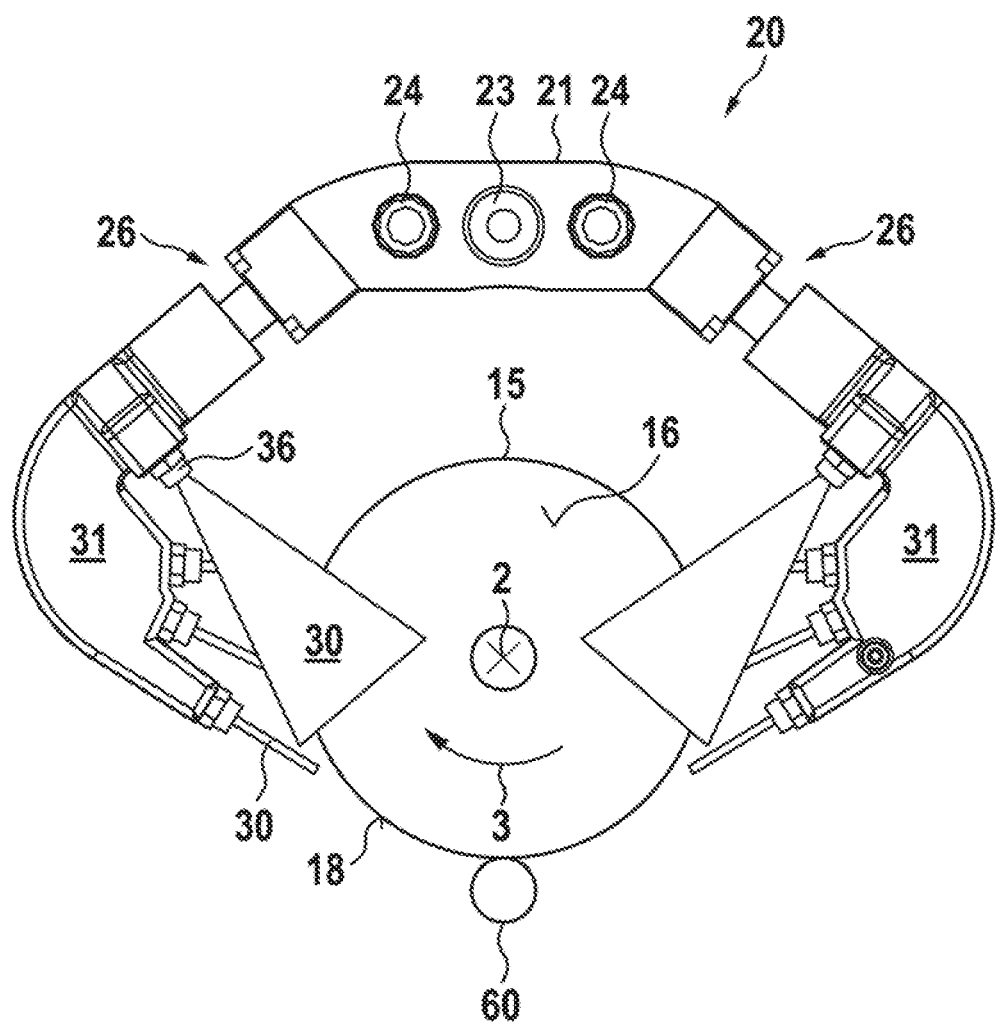
FIG. 5 shows the detail of FIGS. 3 and 4 from another perspective.

As can be best seen in FIGS. 3 and 4, in one implementation the center leg 21 can be decoupled from the support bar 23 and the coolant conduits 24. The coolant jets 30 are depicted for illustrative purposes only. In the decoupled state, of course the nozzles do not emit the coolant. The center leg 21 comprises recesses 53 and 54. The recess 53 is configured to receive the support bar 23. The recesses 54 provide coolant inlets 28 dimensioned to be connected to the coolant conduits 24. In other words, the coolant conduits 24 are configured to engage into the recesses 54. As can be observed, the recess 53 is a through hole having a first diameter and a second, reduced diameter. A connecting surface 55 connects the portions of the first diameter with the portion of the second diameter and provides an axial stop (i.e. an abutment) for the support bar 23. A recessed axially-extending pin 57 of the support bar 23 extends through the recess 53. A slider 56 (FIG. 4) is movably attached to the center leg 21, engages with the recessed pin 57 (see FIG. 2), and interlocks the support bar 23 in the recess 53. In this position, the coolant conduits as well reached their final position as shown in FIGS. 5 and 6. The act of pushing the slider 56 into a release position unlocks the support bar 23 and enables a removal of the center leg 21 (and the components attached to it) to provide for replacement of the center leg by another one, having e.g. different dimensions or supporting differently adjusted nozzles. The slider is thus a locking member 56.

FIGS. 5 and 6 show the position of the nozzle carrier 20 in operation relative to the grinding disc and a workpiece 60. Arrow 3 indicates the direction of rotation of the grinding disc. As can be seen, some of the nozzles point against the direction of rotation 3 to thereby clean off the grinding surface 18. In addition, and in contradistinction with related art, the grinding disc is cooled over an enlarged section of its surface making cooling more efficient. The angle a in FIG. 6 symbolizes a rotation of the nozzle carrier 20 around the rotational axis 2 as explained with respect to FIGS. 1 and 2.

Figure 7:
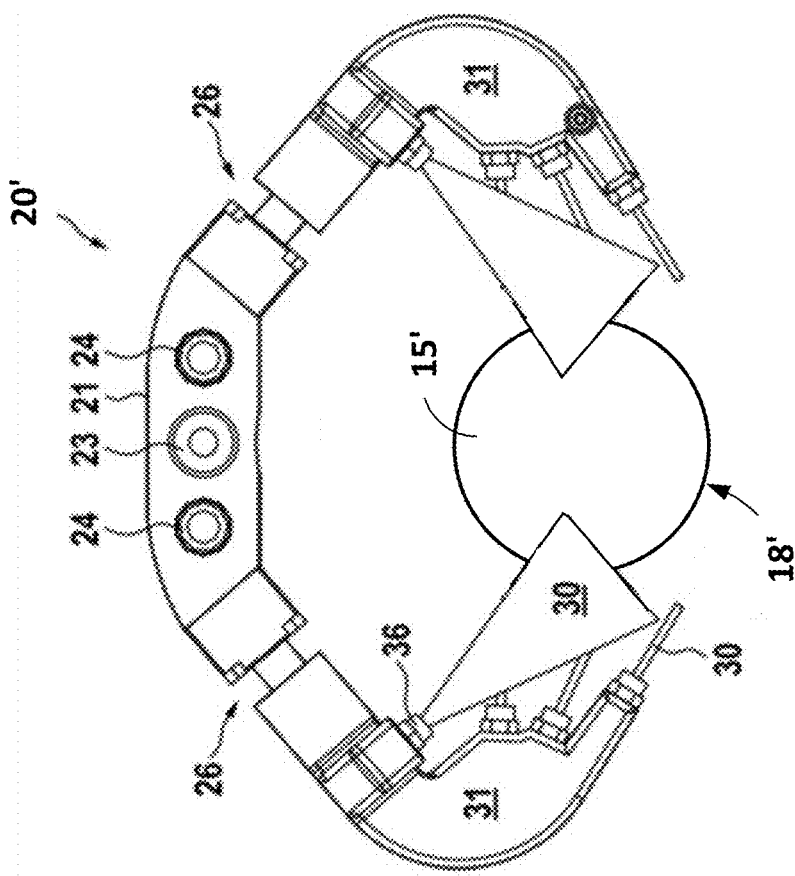
FIG. 7 illustrates additional details of an embodiment of the invention.
Figure 7:
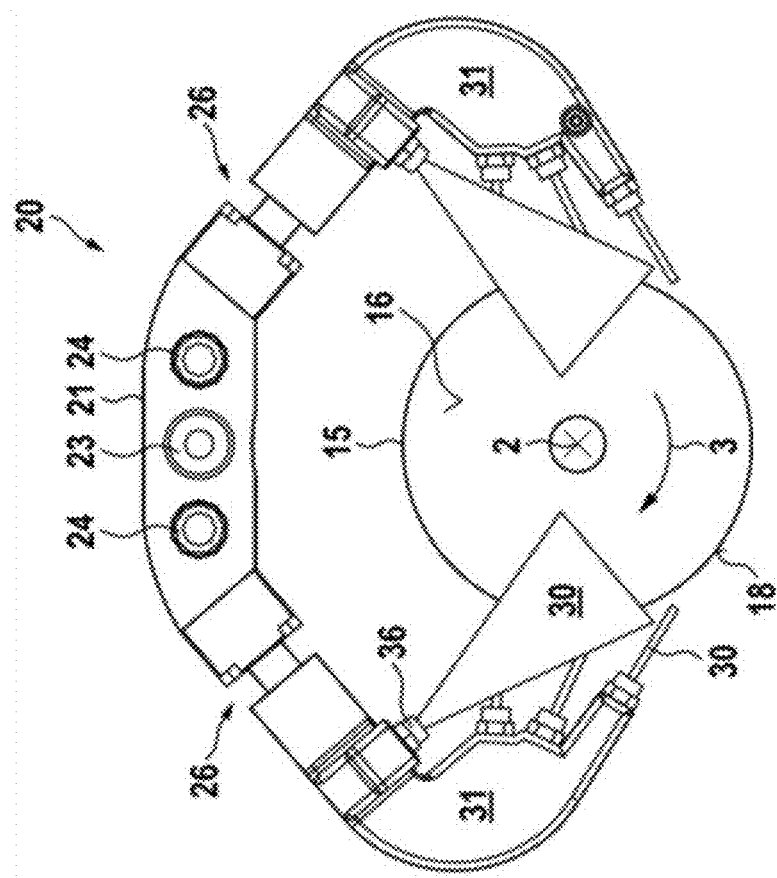

FIG. 7 schematically illustrates the configuration allowing for transportation and replacement of the coolant nozzle carrier. According to one embodiment of the invention, the coolant nozzle exchange apparatus is used to change the coolant nozzle carrier 20 (the two side legs of which are dimensioned to embrace a space of the diameter sufficient to enclose the grinding disk 15 with the peripheral surface 18) to the coolant nozzle carrier 20' (the two side legs of which are dimensioned to embrace another space with a different diameter—that is sufficient, for example, to accommodate another grinding disk 15' with the peripheral surface 18'), and vice versa. As shown, the diameter of the space embraced by the two side legs of the carrier 20 is larger than the diameter of the space embraced by the two side legs of the carrier 20'.

It will be appreciated to those skilled in the art having the benefit of this disclosure that this invention is believed to provide a coolant nozzle carrier e.g. for a grinding machine. Further modifications and alternative embodiments of the invention will be recognized by those skilled in the art in view of this description. Accordingly, this description is to be construed as illustrative only and is for the purpose of teaching those skilled in the art the general manner of carrying out the invention. Described elements and materials may be appropriately substituted, parts and processes may be reversed, and certain features of the invention may be utilized independently, as would be appreciated by one skilled in the art after having the benefit of this description of the invention. Changes may be made in the elements described herein without departing from the spirit and scope of the invention as described in the following claims.

LIST OF REFERENCE NUMERALS 2 rotational axis
3 direction of the rotation
10 spindle
12 spindle bearing and driving unit
15, 15' grinding disc
16 front surface (spindle facing surface of grinding disc)
17 rear surface (surface of the grinding disc being opposed to the spindle)
18, 18' peripheral surface of the grinding disc
20, 20' Coolant nozzle carrier (briefly 'nozzle carrier' or just 'carrier')
21 center leg
22 internal coolant conduit
23 support bar
24 coolant conduit
25 carrier support
26 hinge/ball-and-socket joint
27 coolant passage
28 coolant inlet
29 axial displacement member (optional)
30 coolant jets
31 side leg
35 nozzle
36 nozzle
37 nozzle
40 rotational support
41 first bearing ring
42 second bearing ring
43 coolant inlet
44 coolant outlet
45 coolant conduit
46 slider
49 motor 53 recess
53 recess
55 connecting surface
56 slider/locking member
57 pin
60 workpiece

The invention claimed is:

1. A coolant nozzle carrier configured to be mounted to a grinding machine, the grinding machine having a grinding spindle defining a rotational axis, the grinding spindle being configured to support and drive a grinding disc, the coolant nozzle carrier comprising:
    at least two coolant nozzles configured to provide a fluid coolant to the grinding disk;
    at least a center leg and two side legs each being attached to the center leg, wherein
        each of the two side legs supports at least one of the at least two coolant nozzles,
        the two side legs extend in a plane and embrace a space dimensioned to receive the grinding disc;
    and
    at least one of a pivotable attachment and hinges, wherein at least one of the following conditions is satisfied:
        a) the side legs are pivotably attached to the center leg with said pivotable attachment, and
        b) each of the side legs comprises a corresponding hinge and a corresponding free end, said hinge enabling said free end of the side legs to pivot outward;
    wherein the at least one of the pivotable attachment and hinges are configured to provide a stop to define a minimum distance between the two side legs; and
    wherein the two side legs are spring loaded against the stop.

2. The coolant nozzle carrier of claim 1,
    wherein the center leg comprises at least one coolant inlet, wherein each of the side legs and the center leg comprises an internal coolant channel providing a fluid communication between the at least one coolant nozzle and the at least one coolant inlet.

3. The coolant nozzle carrier of claim 1,
    wherein the center leg is supported by a support bar, wherein the support bar extends perpendicularly to the center leg.

4. The coolant nozzle carrier of claim 3,
    wherein at least one of the support bar and the center leg comprises a locking member configured to release a connection between the support bar and the center leg.

5. The coolant nozzle carrier of claim 3,
    wherein the center leg contains a coolant channel, and
    wherein the support bar includes a coolant conduit configured to be in fluid communication with the coolant channel of the center leg.

6. The coolant nozzle carrier of claim 2,
    wherein the at least one coolant inlet of the center leg is connected to a coolant conduit-configured to supply a coolant to the coolant inlet, and wherein the coolant conduit has a longitudinal axis extending orthogonally to the center leg.

7. The coolant nozzle carrier of claim 6,
    wherein the coolant conduit and the coolant inlet of the center leg form a releasable coupling structured to couple and decouple the coolant conduit and said coolant inlet.

8. The coolant nozzle carrier of claim 1,
    wherein the center leg is rotatably supported, and wherein an axis of rotation of the center leg is said rotational axis.

9. The coolant nozzle carrier of claim 1,
    further comprising at least one nozzle having a coolant outlet configured to deliver a coolant flow tangentially with respect to a peripheral surface of the grinding disc and against a direction of rotation of the grinding disc.

10. The coolant nozzle carrier of claim 1,
    further comprising at least one nozzle having a coolant outlet configured to deliver a coolant flow tangentially with respect to a peripheral surface of the grinding disc and along a direction of rotation of the grinding disc.

11. The coolant nozzle carrier of claim 1,
    further comprising at least one nozzle having a coolant outlet pointing towards a front side or a rear side of the grinding disc.

12. A grinding machine having a grinding spindle configured to support and drive a grinding disc that has a rotational axis, wherein the grinding machine further comprises the coolant nozzle carrier of claim 1.

13. The grinding machine of claim 12,
    further comprising:
        a first coolant nozzle carrier of claim 1, wherein the two side legs are dimensioned to embrace a space defining a first diameter,
        a second coolant nozzle carrier of claim 1, wherein the two side legs are dimensioned to embrace a space defining a second diameter,
        a coolant nozzle exchange apparatus configured, in operation, to transport and replace the first coolant nozzle carrier with the second coolant nozzle carrier and vice versa.

14. The grinding machine of claim 12, wherein the plane is perpendicular to the rotational axis, and wherein the two side legs are configured to accommodate the grinding disk in said space with a moving gap between the grinding disk and the two side legs.

15. The grinding machine of claim 12,
    wherein the center leg comprises at least one coolant inlet, wherein each of the side legs and the center leg comprises an internal coolant channel providing a fluid communication between the at least one coolant nozzle and the at least one coolant inlet, and
    wherein the at least one coolant inlet of the center leg is connected to a coolant conduit-configured to supply a coolant to the coolant inlet, and wherein the coolant conduit has a longitudinal axis extending orthogonally to the center leg and parallel to the rotational axis.

16. The grinding machine according to claim 12,
    wherein the center leg comprises at least one coolant inlet, wherein each of the side legs and the center leg comprises an internal coolant channel providing a fluid communication between the at least one coolant nozzle and the at least one coolant inlet,
    wherein the at least one coolant inlet of the center leg is connected to a coolant conduit-configured to supply a coolant to the coolant inlet, and wherein the coolant conduit has a longitudinal axis extending orthogonally to the center leg and parallel to the rotational axis,
    wherein the center leg is rotatably supported, and
    wherein an axis of rotation of the center leg is said rotational axis.

* * * * *